United States Patent
Nakajima

(10) Patent No.: US 11,934,707 B2
(45) Date of Patent: Mar. 19, 2024

(54) IMAGE FORMING APPARATUS, CONTROL METHOD, AND STORAGE MEDIUM

(71) Applicant: CANON KABUSHIKI KAISHA, Tokyo (JP)

(72) Inventor: Satoru Nakajima, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,471

(22) Filed: Nov. 23, 2022

(65) Prior Publication Data

US 2023/0168844 A1    Jun. 1, 2023

(30) Foreign Application Priority Data

Nov. 29, 2021   (JP) ................................. 2021-192728

(51) Int. Cl.
*G06F 3/12*   (2006.01)
(52) U.S. Cl.
CPC .......... *G06F 3/1204* (2013.01); *G06F 3/1257* (2013.01)

(58) Field of Classification Search
CPC ............................ G06F 3/1204; G06F 3/1257
See application file for complete search history.

(56) References Cited

U.S. PATENT DOCUMENTS

2019/0220237 A1*  7/2019  Maeda .................. G06F 3/1273

FOREIGN PATENT DOCUMENTS

JP        2019123127 A        7/2019

* cited by examiner

*Primary Examiner* — Helen Zong
(74) *Attorney, Agent, or Firm* — Canon U.S.A., Inc. IP Division

(57) ABSTRACT

An image forming apparatus includes a registration unit configured to register a button in association with path information indicating a file storage destination and print settings, a display unit configured to display a screen including the registered button, an acquisition unit configured to acquire one or more files by using the path information without asking a user to make a selection in a case where the displayed button is selected, and an execution unit configured to execute printing of the acquired one or more files based on the print settings.

7 Claims, 17 Drawing Sheets

FIG. 7

```
701
  ┌─────────────────────────────────────────────────────┐
  │ FIXED FORM PRINTING            709        710       │
  │  ┌─────────────────────────────────────────────┐    │
  │  │ REGISTER NEW BUTTON         [ OK ] [CANCEL] │    │
  │  │  BASIC SETTING                              │~702│
  │  │    BUTTON NAME:  [ Form1 ]~703              │    │
  │  │    FOLDER PATH:  [\\192.168.001.001:\folder1\]~704│
  │  ├─────────────────────────────────────────────┤    │
  │  │  PRINT SETTING                              │~705│
  │  │   TWO-SIDED:   ● TWO-SIDED ~706             │    │
  │  │                ○ ONE-SIDED                  │    │
  │  │   COLOR MODE:  ○ AUTOMATIC(COLOR/BLACK AND WHITE)│
  │  │                ● COLOR             ~707     │    │
  │  │                ○ MONOCHROME                 │    │
  │  │   NUMBER OF COPIES:  [ 3 ]~708              │    │
  │  └─────────────────────────────────────────────┘    │
  └─────────────────────────────────────────────────────┘
```

FIG. 9

| REGISTRATION ID | REGISTRATION DATE AND TIME | BUTTON NAME | FOLDER PATH | PRINT SETTING |
|---|---|---|---|---|
| 1 | 2021/10/25 10:34:45 | Form1 | \\192.168.001.001 \folder1\ | TWO-SIDED 3 COPIES COLOR |

FIG. 13

| REGISTRATION ID | REGISTRATION DATE AND TIME | BUTTON NAME | FOLDER PATH | PRINT SETTING |
|---|---|---|---|---|
| 1 | 2021/10/25 10:34:45 | Form1 | \\192.168.001.001 :\folder1\ | TWO-SIDED 3 COPIES COLOR |
| 2 | 2021/10/25 10:34:45 | Form1 | \\192.168.001.001 :\folder2\ | ONE-SIDED 1 COPY COLOR |
| 3 | 2021/10/25 10:34:45 | Form1 | \\192.168.001.001 :\folder3\ | ONE-SIDED 1 COPY BLACK AND WHITE |

FIG. 16

| REGISTRATION ID | REGISTRATION DATE AND TIME | BUTTON NAME | FOLDER PATH | FILE NAME | PRINT SETTING |
|---|---|---|---|---|---|
| 1 | 2021/10/25 10:34:45 | Form1 | \\192.168.001.001:\folder1\ | | TWO-SIDED 3 COPIES COLOR |
| 2 | 2021/10/25 10:34:45 | Form1 | \\192.168.001.001:\folder2\ | | ONE-SIDED 1 COPY COLOR |
| 3 | 2021/10/25 10:34:45 | Form1 | \\192.168.001.001:\folder3\ | | ONE-SIDED 1 COPY BLACK AND WHITE |
| 4 | 2021/10/25 10:34:45 | Form1 | \\192.168.001.001:\folderA\ | aaa.pdf | ONE-SIDED 1 COPY BLACK AND WHITE |
| 5 | 2021/10/25 10:34:45 | Form1 | \\192.168.001.001:\folderB\ | bbb.pdf | ONE-SIDED 1 COPY BLACK AND WHITE |

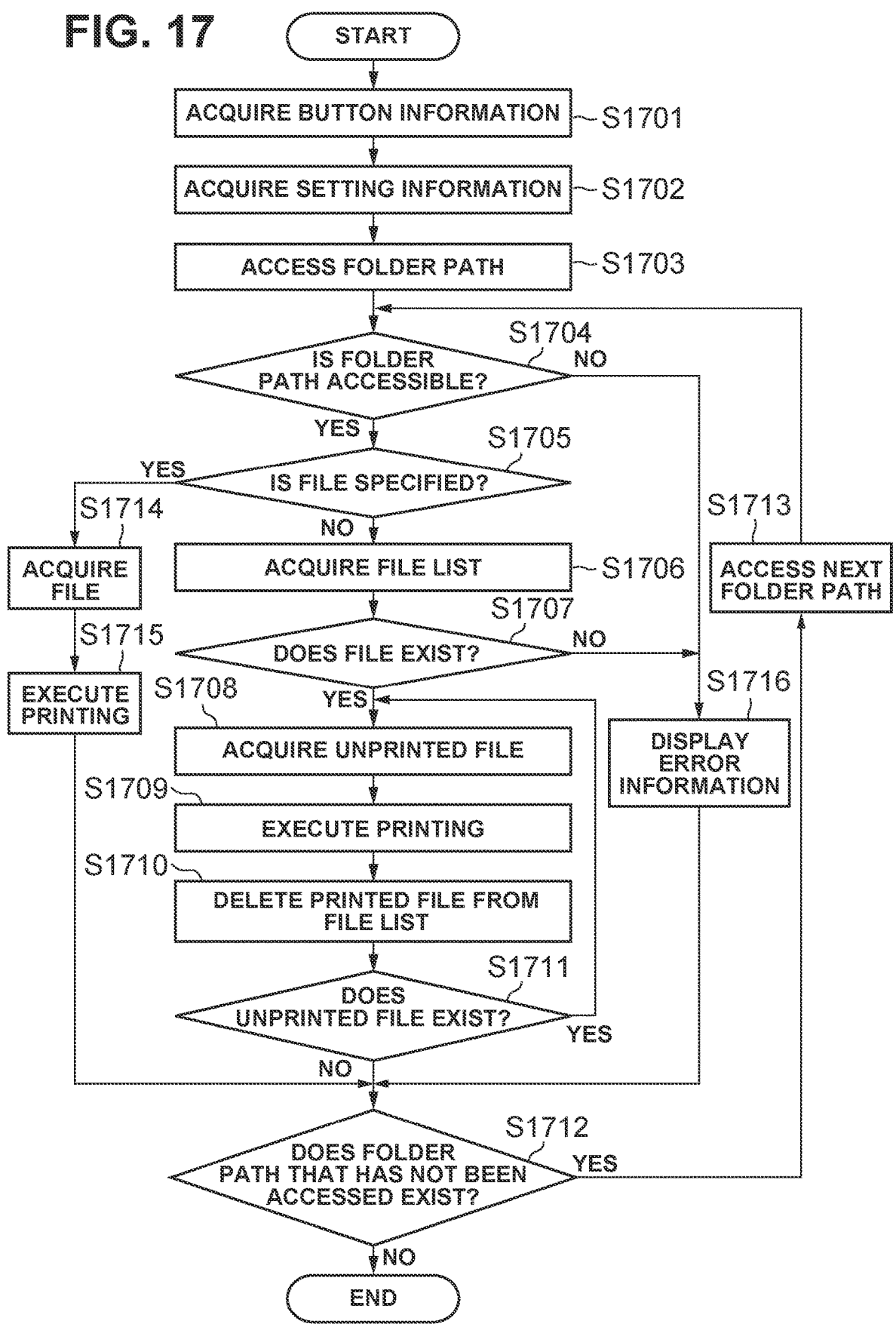

IMAGE FORMING APPARATUS, CONTROL METHOD, AND STORAGE MEDIUM

BACKGROUND

Field of the Disclosure

The present disclosure relates to an image forming apparatus for executing printing of a file, a control method, and a storage medium.

Description of the Related Art

For the purpose of improvement in convenience of a printing operation, there is provided an image forming apparatus having a function called "fixed form printing". The image forming apparatus saves a file that is a printing target in association with print settings through a registration operation performed by a user (i.e., administrator), and displays a selectable button on an operation unit of the image forming apparatus. The button is called a "fixed form printing button". The image forming apparatus registers the file that is a printing target and the print settings in association with the fixed form printing button, and executes printing of the file associated with the fixed form printing button based on the specified print settings when the fixed form printing button is pressed by the user. The function is beneficial in a case where printing of a file frequently used or printed repeatedly is executed using the same print settings every time.

Japanese Patent Application Laid-Open No. 2019-123127 discusses a technique for displaying a setting screen which allows a user to select printing target data from among data stored in one storage destination specified based on a printing history when the printing history is selected, although the technique does not relate to the fixed form printing function. Then, the data which the user has selected from the setting screen is specified as a printing target.

SUMMARY

According to embodiments of the present disclosure, an image forming apparatus includes a registration unit configured to register a button in association with path information indicating a file storage destination and print settings, a display unit configured to display a screen including the registered button, an acquisition unit configured to acquire one or more files by using the path information without asking a user to make a selection in a case where the displayed button is selected, and an execution unit configured to execute printing of the acquired one or more files based on the print settings.

Further features of the present disclosure will become apparent from the following description of exemplary embodiments with reference to the attached drawings.

BRIEF DESCRIPTION OF THE DRAWINGS

FIG. 7 is a diagram illustrating an example of a new registration screen of the fixed form printing button according to a first exemplary embodiment.

FIG. 9 is a diagram illustrating an example of a setting information management table according to the first exemplary embodiment.

FIG. 13 is a diagram illustrating an example of a setting information management table of saved setting information according to the second exemplary embodiment.

FIG. 16 is a diagram illustrating an example of a setting information management table of saved setting information according to the third exemplary embodiment.

FIG. 17 is a flowchart illustrating printing processing according to the third exemplary embodiment, executed when the fixed form printing button is pressed.

DESCRIPTION OF THE EMBODIMENTS

According to the technique discussed in Japanese Patent Application Laid-Open No. 2019-123127, the user can specify a plurality of files as printing targets by selecting printing target data from among data stored in a storage destination. However, the user has to perform operation to select the plurality of files from the setting screen.

Embodiments of the present disclosure are directed to a system for executing printing of one or more files stored in a file storage destination without asking a user to make a selection in a case where a button registered in association with path information indicating the file storage destination and print settings is selected.

Hereinafter, exemplary embodiments of the present disclosure will be described with reference to the appended drawings. In a first exemplary embodiment, when a user presses a fixed form printing button, a file stored in one folder indicated by a folder path is printed without asking the user to make a selection.

Figure 1:
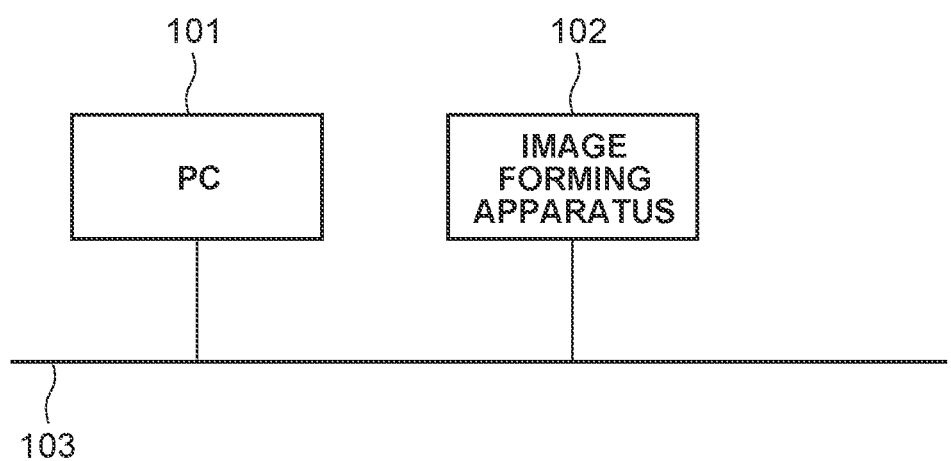
FIG. 1 is a block diagram illustrating an example of a network configuration.

FIG. 1 is a block diagram illustrating an example of a network configuration. A personal computer (PC) 101 and an image forming apparatus 102 are connected to a local area network (LAN) 103. The number of PCs and image forming apparatuses connected to the LAN 103 is not limited to the above. The PC 101 displays a screen for making various types of settings of the image forming apparatus 102 and makes the settings of the image forming apparatus 102 in a web browser by using a web server function included in the image forming apparatus 102. Further, the PC 101 saves data to be a printing target. The image forming apparatus 102 manages a value set by the PC 101, and executes operations such as a screen display operation and a job execution operation based on the set value. Further, the image forming apparatus 102 saves data to be a printing target.

In the present exemplary embodiment, while the settings of the image forming apparatus 102 is made by the PC 101, the settings can be made by a device other than the PC 101, such as a mobile terminal or another image forming apparatus.

Further, data to be a printing target may be saved in the PC 101, a device having a data storage function connectable to the LAN 103, or a data storage device connectable to the image forming apparatus 102.

Figure 2:
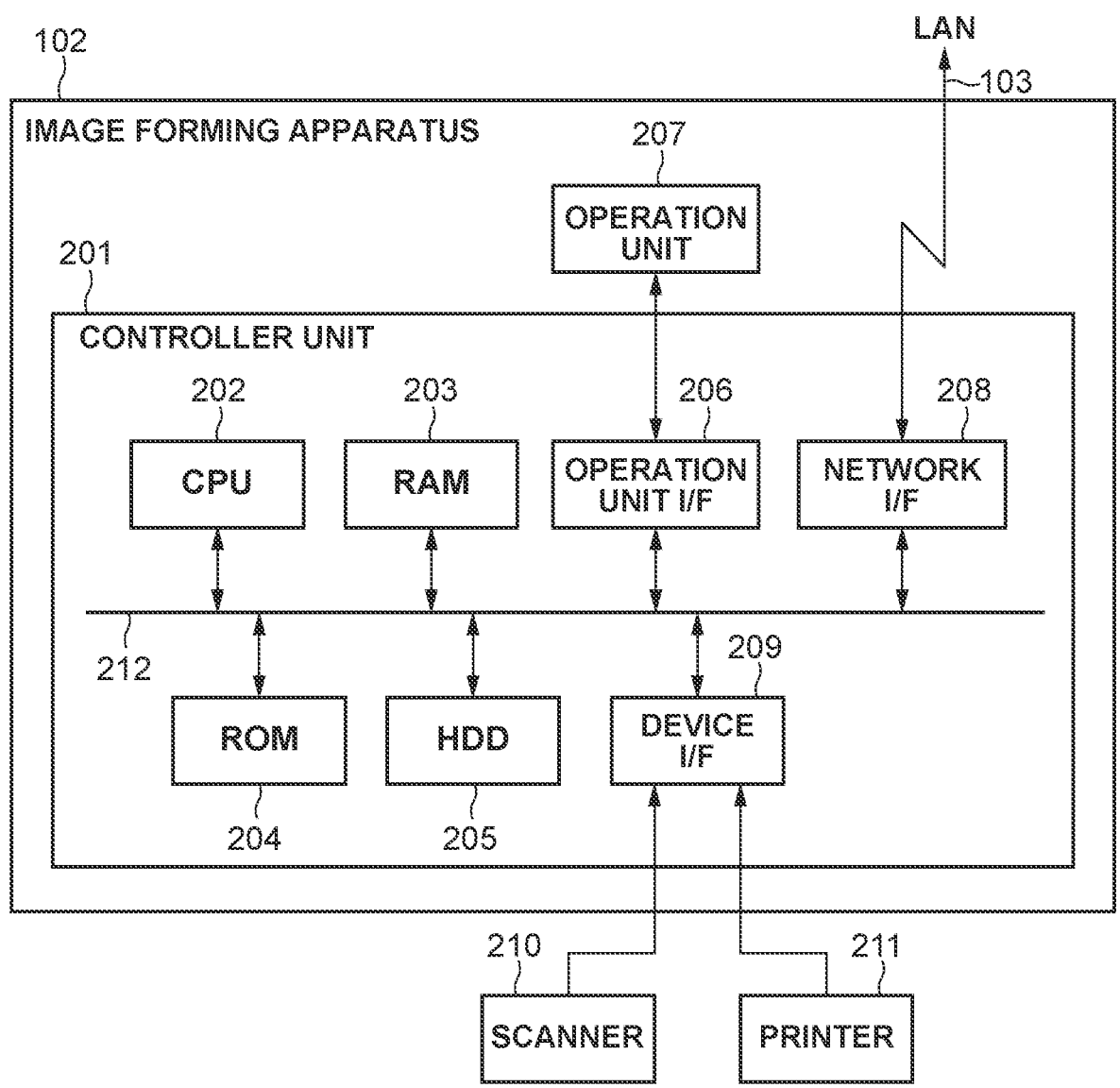
FIG. 2 is a block diagram illustrating an overall configuration of an image forming apparatus.

FIG. 2 is a block diagram illustrating an overall configuration of the image forming apparatus 102. A central processing unit (CPU) 202 included in a controller unit 201 of the image forming apparatus 102 serves as an arithmetic device for controlling the entire system. A random access memory (RAM) 203 is used as a system work memory when the processing is executed by the CPU 202, and also used as an image memory for temporarily storing image data. Further, the RAM 203 stores programs and data such as an operating system, system software, and application software. A read only memory (ROM) 204 stores a boot program of the system. A hard disk drive (HDD) 205 stores an operating system, system software, application software, image data, and setting data. Another storage device such as a solid state drive (SSD), a secure digital (SD) memory card, or an embedded multimedia card (eMMC) can be used as long as data can be stored therein. An operation unit interface (I/F) 206 is an interface unit which outputs information to be displayed on an operation unit 207 to the operation unit 207. The operation unit I/F 206 receives information input by the user via the operation unit 207. A network I/F 208 connects to the network (i.e., LAN 103) to output and receive information to/from a PC and another image forming apparatus connected to the same LAN. A device I/F 209 connects the controller unit 201 with a scanner 210 and a printer 211 that are image input/output devices to receive and output image data. The above-described devices are arranged on a system bus 212.

Figure 3:
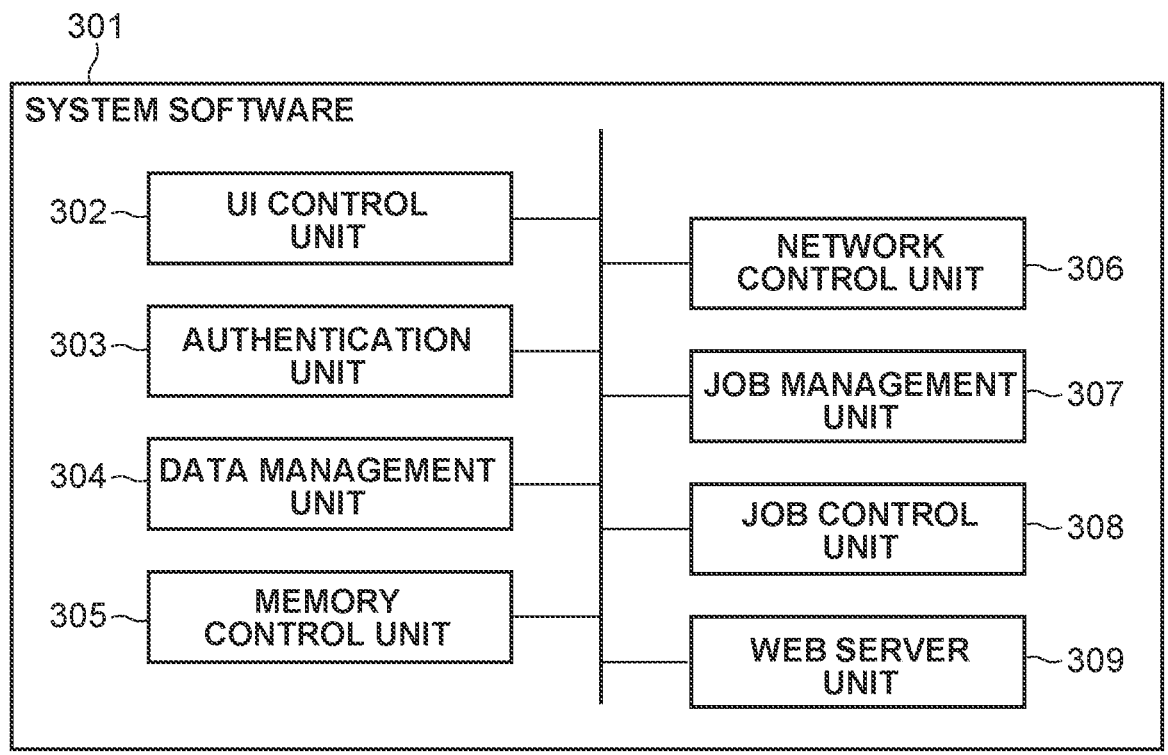
FIG. 3 is a block diagram illustrating a functional configuration of system software of the image forming apparatus.

FIG. 3 is a block diagram illustrating a functional configuration of the system software of the image forming apparatus 102. System software 301 is stored in any one of the RAM 203, the ROM 204, and the HDD 205 and executed by the CPU 202.

A user interface (UI) control unit 302 receives information input by the user on the operation unit 207 via the operation unit I/F 206, and transmits the information to an authentication unit 303, a data management unit 304, and a job management unit 307. Further, the UI control unit 302 receives a response from the authentication unit 303, the data management unit 304, or the job management unit 307, and outputs the received information to the operation unit 207 via the operation unit I/F 206.

The authentication unit 303 executes authentication processing based on authentication information received from the UI control unit 302 and returns a processing result.

The data management unit 304 receives a data-writing/data-reading request from the UI control unit 302, a network control unit 306, the job management unit 307, or a web server unit 309, and transmits the data-writing/data-reading request to a memory control unit 305. Further, the data management unit 304 receives a response from the memory control unit 305, and transmits the received information to the UI control unit 302, the network control unit 306, the job management unit 307, or the web server unit 309.

The memory control unit 305 receives a data-writing/data-reading request from the data management unit 304, writes and reads data to/from the HDD 205, and returns a result of the writing/reading to the data management unit 304.

The network control unit 306 receives a request from the PC 101 or any image forming apparatus connected to the LAN 103 via the network I/F 208. Then, the network control unit 306 requests the data management unit 304, the job management unit 307, or the web server unit 309 to execute processing depending on the received request. The network control unit 306 further receives a response from the data management unit 304, the job management unit 307 or the web server unit 309. Then, the network control unit 306 transmits the received response to the PC 101 or the image forming apparatus connected to the LAN 103 via the network I/F 208.

The job management unit 307 receives a job execution request from the UI control unit 302, the network control unit 306, or the web server unit 309 and manages a job. Then, the job management unit 307 requests a job control unit 308 to execute the job. Alternatively, the job management unit 307 transmits a data-writing/data-reading request to the data management unit 304. Alternatively, the job management unit 307 receives a response from the data management unit 304 or the job control unit 308, and transmits the information about a job status to the UI control unit 302, the network control unit 306, or the web server unit 309.

The job control unit 308 receives a job execution request from the job management unit 307 and controls operation of the scanner 210 or the printer 211 via the device I/F 209. Further, the job control unit 308 receives information about operation statuses of the scanner 210 and the printer 211 via the device I/F 209, and transmits the received information to the job management unit 307.

The web server unit 309 receives a hyper-text transfer protocol (HTTP) request from the network control unit 306. Then, the web server unit 309 analyzes the received data, and receives a response from the data management unit 304 or the job management unit 307 depending on a result of analysis. Then, the web server unit 309 transmits the received response to the network control unit 306.

Figure 4:
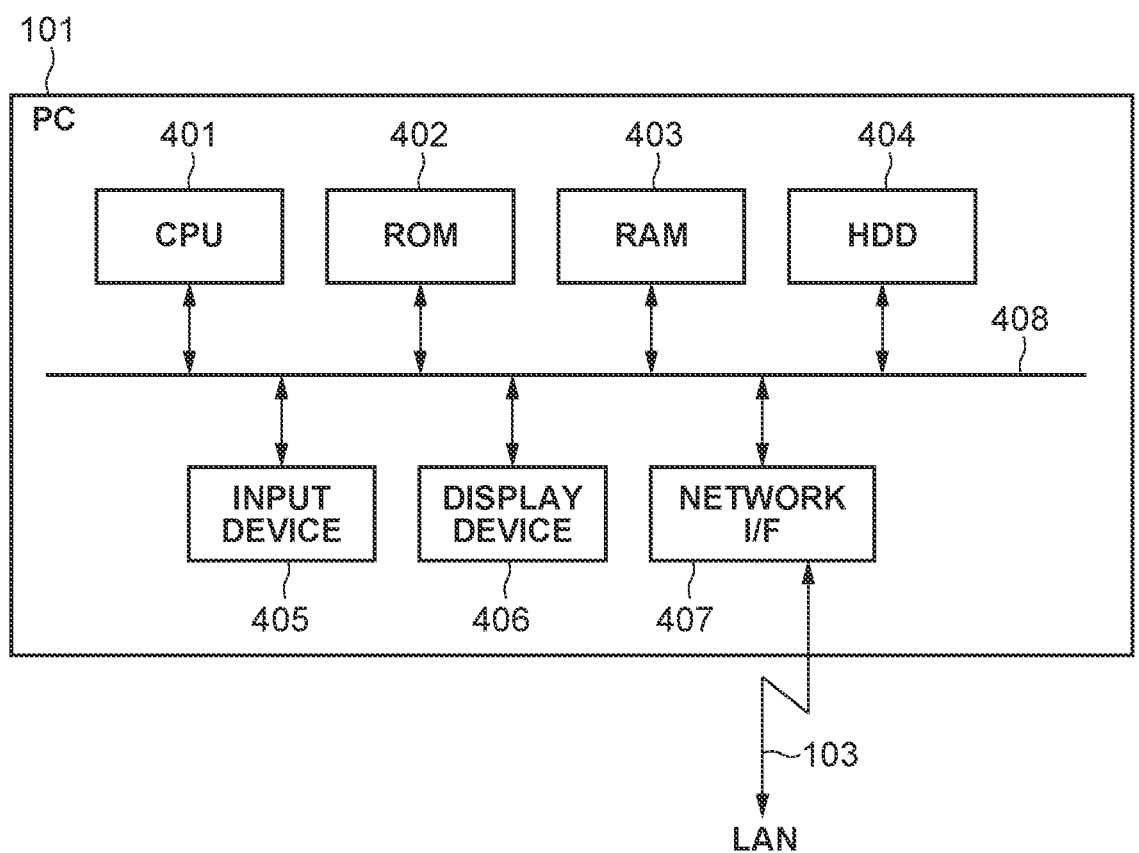
FIG. 4 is a block diagram illustrating an overall configuration of a personal computer (PC).

FIG. 4 is a block diagram illustrating an overall configuration of the PC 101. A CPU 401 included in the PC 101 serves as an arithmetic device for controlling the entire system. A ROM 402 stores programs and data relating to various types of processing. A RAM 403 is used as a system work memory when the processing is executed by the CPU 401, and also used as a memory for storing temporary data relating to the processing. A hard disk drive (HDD) 404 stores programs, data, temporary data, and application data relating to various types of processing. An input device 405 is a keyboard and a pointing device for receiving input of an instruction for the PC 101. A display device 406 displays an operation status of the PC 101 and information output from a program operating on the PC 101. A network I/F 407 connects to the network (i.e., LAN 103) and outputs and receives information to and from another PC and another image forming apparatus connected to the same LAN. The above-described components are arranged on a system bus 408.

Functions (or processing) of an operating system (OS) and a printer driver are implemented by the CPU 401 executing processing based on the programs corresponding to the OS, the printer driver, and applications stored in the HDD 404.

Figure 5:
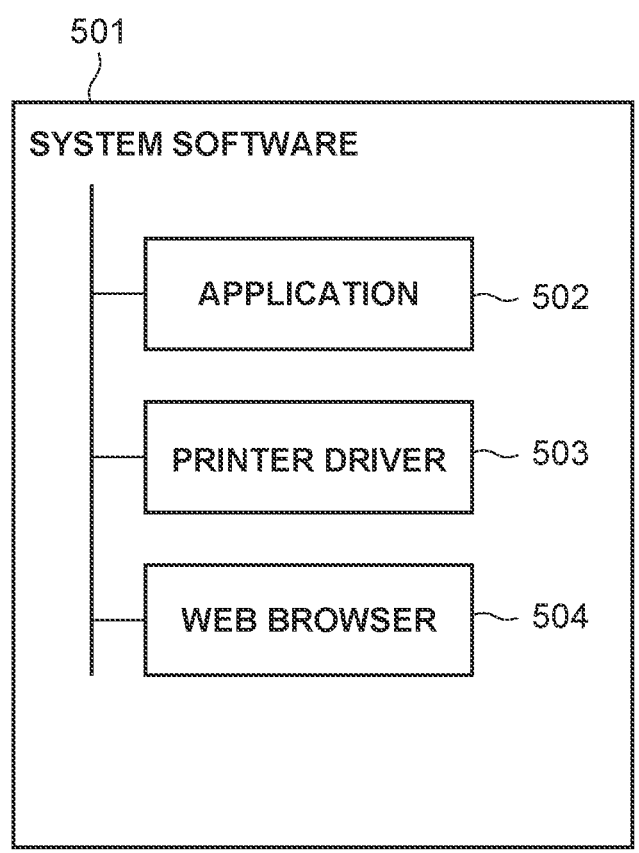
FIG. 5 is a block diagram illustrating a configuration of system software of the PC.

FIG. 5 is a block diagram illustrating a configuration of system software of the PC 101. System software 501 is stored in any one of the ROM 402, the RAM 403, and the HDD 404, and executed by the CPU 401.

The system software 501 includes an application 502, a printer driver 503, and a web browser 504. The application 502 is a tool which allows a user to create and edit data such as image data and document data by using the input device 405 such as a pointing device or a keyboard while looking at the display device 406 of the PC 101. Data which describes a printing instruction of the created or edited data is created by the printer driver 503, and transmitted to an apparatus such as the image forming apparatus 102 capable of executing printing. The web browser 504 provides the web server unit 309 with a function for analyzing the hyper-text markup language (HTML) of web contents and displaying the web contents on the display device 406 and a function for analyzing and executing JavaScript (registered trademark).

Figure 6:
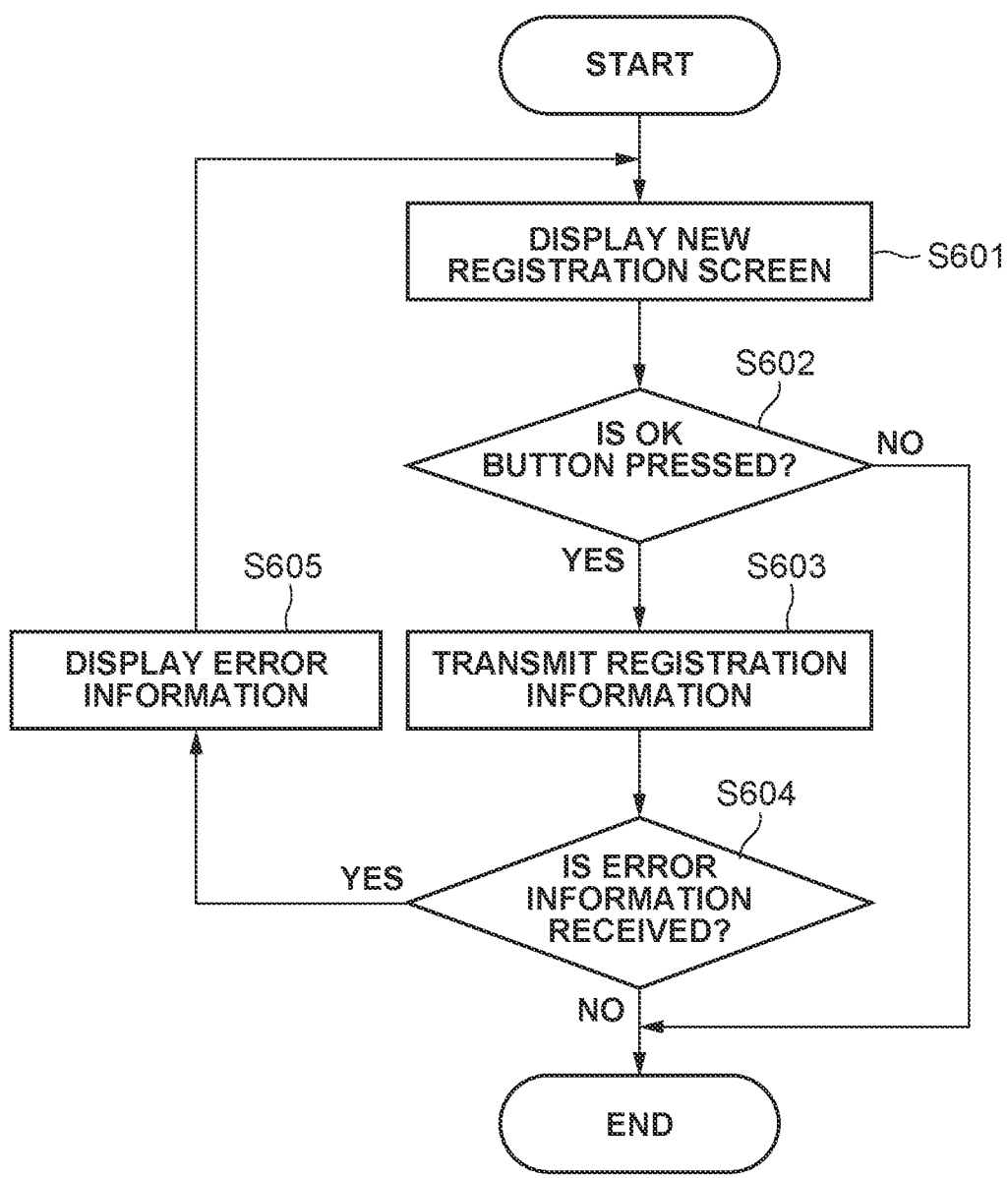
FIG. 6 is a flowchart illustrating registration processing of a fixed form printing button.

FIG. 6 is a flowchart illustrating registration processing of the fixed form printing button executed by the CPU 401 of the PC 101.

The user operates the web browser 504 to register the fixed form printing button by using the input device 405 such as a pointing device or a keyboard while looking at the display device 406. In step S601, the user displays a setting screen of the image forming apparatus 102 by specifying a uniform resource locator (URL) (e.g., an internet protocol (IP) address) of the image forming apparatus 102 in the web browser 504, and displays a new registration screen of the fixed form printing button from the setting screen.

FIG. 7 is a diagram illustrating an example of the new registration screen of the fixed form printing button according to the first exemplary embodiment. For example, a new registration screen 701 illustrated in FIG. 7 is a remote UI screen. Items used to input basic settings are displayed in an area 702 of the new registration screen 701 of the fixed form printing button. A textbox 703 is used to input a button name of the fixed form printing button to be displayed on the operation unit 207. A textbox 704 is used to input path information indicating a storage destination of a file to be printed when the fixed form printing button is selected. An example of a folder path input thereto is illustrated in the textbox 704. The user may manually input a path in the textbox 704, or may select a referenced folder path by using a reference button (not illustrated). In the present exemplary embodiment, a folder and a file may be saved in the HDD 205 of the image forming apparatus 102, or may be saved in an external storage (not illustrated) accessible by the image forming apparatus 102.

Items used to input print settings are displayed in an area 705. A radio button 706 is used to set two-sided printing, a radio button 707 is used to set a color mode, and a text box 708 is used to input the number of output copies. An OK button 709 is pressed when the user confirms the basic setting and the print setting input to the screen. A cancel button 710 is pressed when the user cancels the basic setting and the print setting input to the screen.

In step S602, when the user presses the OK button 709 after inputting the basic settings and the print settings to the new registration screen 701 of the fixed form printing button (YES in step S602), the processing proceeds to step S603. In step S603, the web browser 504 transmits setting information to the image forming apparatus 102. In step S604, the web browser 504 determines whether error information is received as a transmission result. If the error information is received (YES in step S604), the processing proceeds to step S605. In step S605, the web browser 504 displays the error information on the display device 406. Then, the processing proceeds to step S601. If the error information is not received (NO in step S604), the processing is ended.

Figure 8:
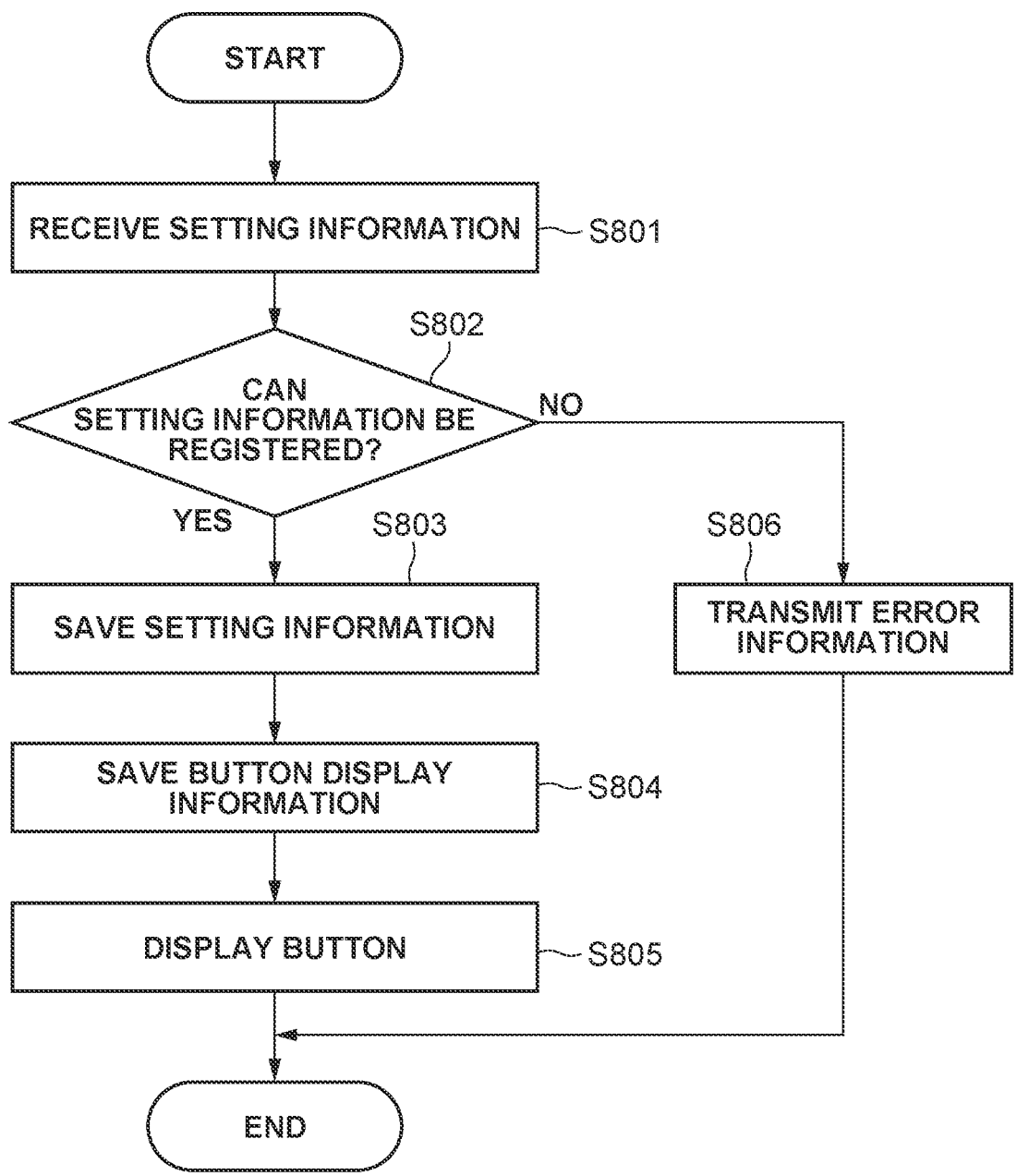
FIG. 8 is a flowchart illustrating registration processing of the fixed form printing button.

FIG. 8 is a flowchart illustrating registration processing of the fixed form printing button executed by the CPU 202 of the image forming apparatus 102.

Figure 10:
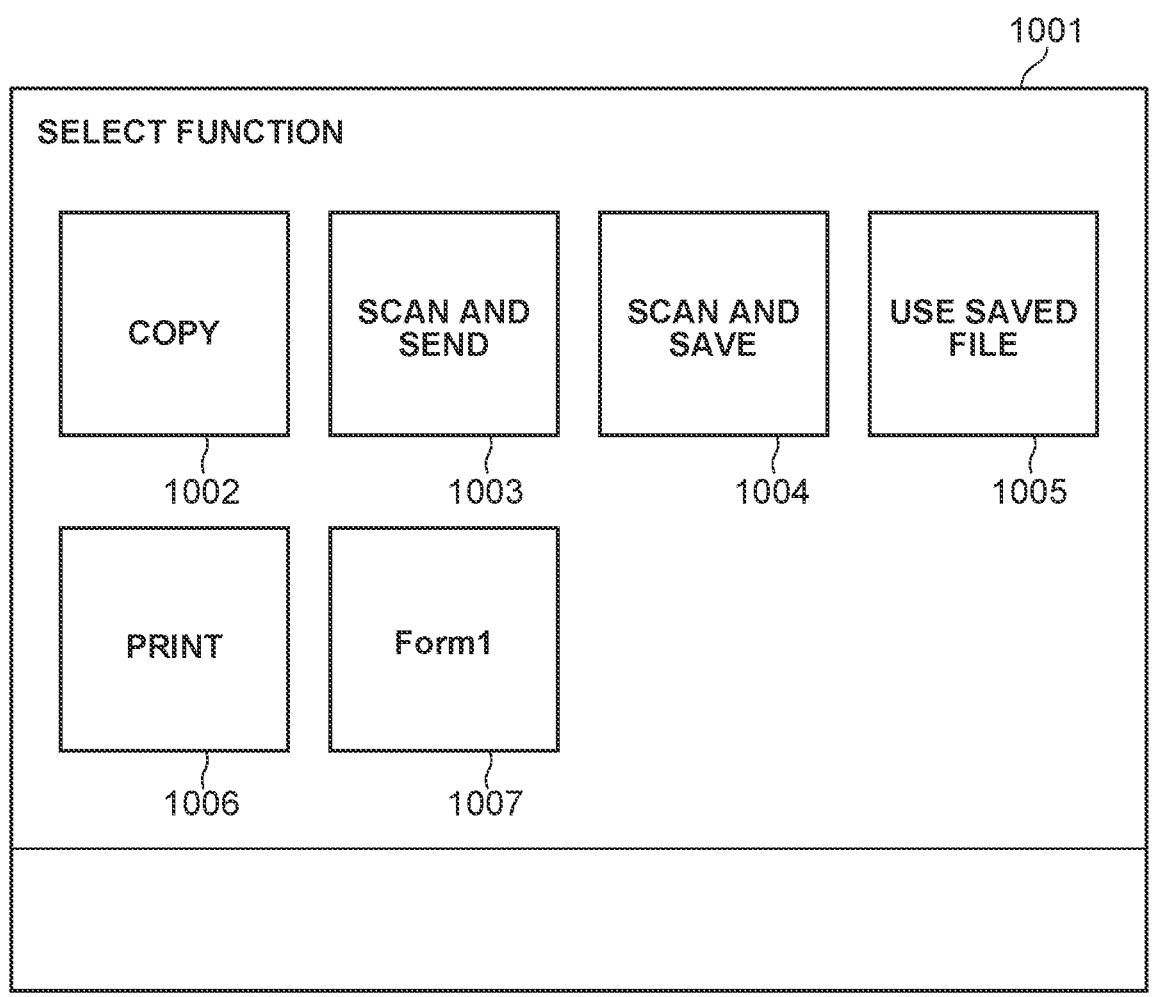
FIG. 10 is a diagram illustrating an example of a function selection screen.

In step S801, the web server unit 309 receives the setting information of the fixed form printing button from the PC 101 via the network control unit 306. In step S802, the web server unit 309 determines whether the setting information can be registered as a fixed form printing button. For example, if a condition relating to usable characters or the usable number of characters for the button name is not satisfied, or if the button name is the same as a button name of another fixed form printing button already registered in the image forming apparatus 102, the web server unit 309 determines that the setting information cannot be registered. If the web server unit 309 determines that the setting information cannot be registered (NO in step S802), the processing proceeds to step S806. In step S806, the web server unit 309 transmits error information to the PC 101 via the network control unit 306. Then, the processing is ended. If the web server unit 309 determines that the setting information can be registered (YES in step S802), the web server unit 309 transmits the received setting information to the data management unit 304. In step S803, the data management unit 304 saves the received setting information in the HDD 205 via the memory control unit 305. FIG. 9 is a diagram illustrating an example of a setting information management table. A registration ID for identifying the setting information is described in a column 902 of a setting information management table 901. A registration date and time of the setting information is described in a column 903. A name of the registered fixed form printing button is described in a column 904. A storage destination of a file that is to be a printing target when the registered fixed form printing button is selected is described in a column 905. Print settings to be applied when printing is executed by a press of the fixed form printing button is described in a column 906. The data management unit 304 further transmits display information of the fixed form printing button to be displayed on the operation unit 207 to the UI control unit 302. In step S804, the UI control unit 302 saves the received display information of the fixed form printing button in the HDD 205 via the memory control unit 305. Then, in step S805, the UI control unit 302 causes the operation unit 207 to display the fixed form printing button. FIG. 10 is a diagram illustrating an example of a function selection screen. Function buttons 1002 to 1006 displayed on a function selection screen 1001 are pressed when the image forming apparatus 102 is used. A function screen (not illustrated) corresponding to each of the buttons 1002 to 1006 is displayed when any one of the buttons 1002 to 1006 is pressed. A fixed form printing button 1007 is a button registered through the registration processing of the fixed form printing button.

Figure 11:
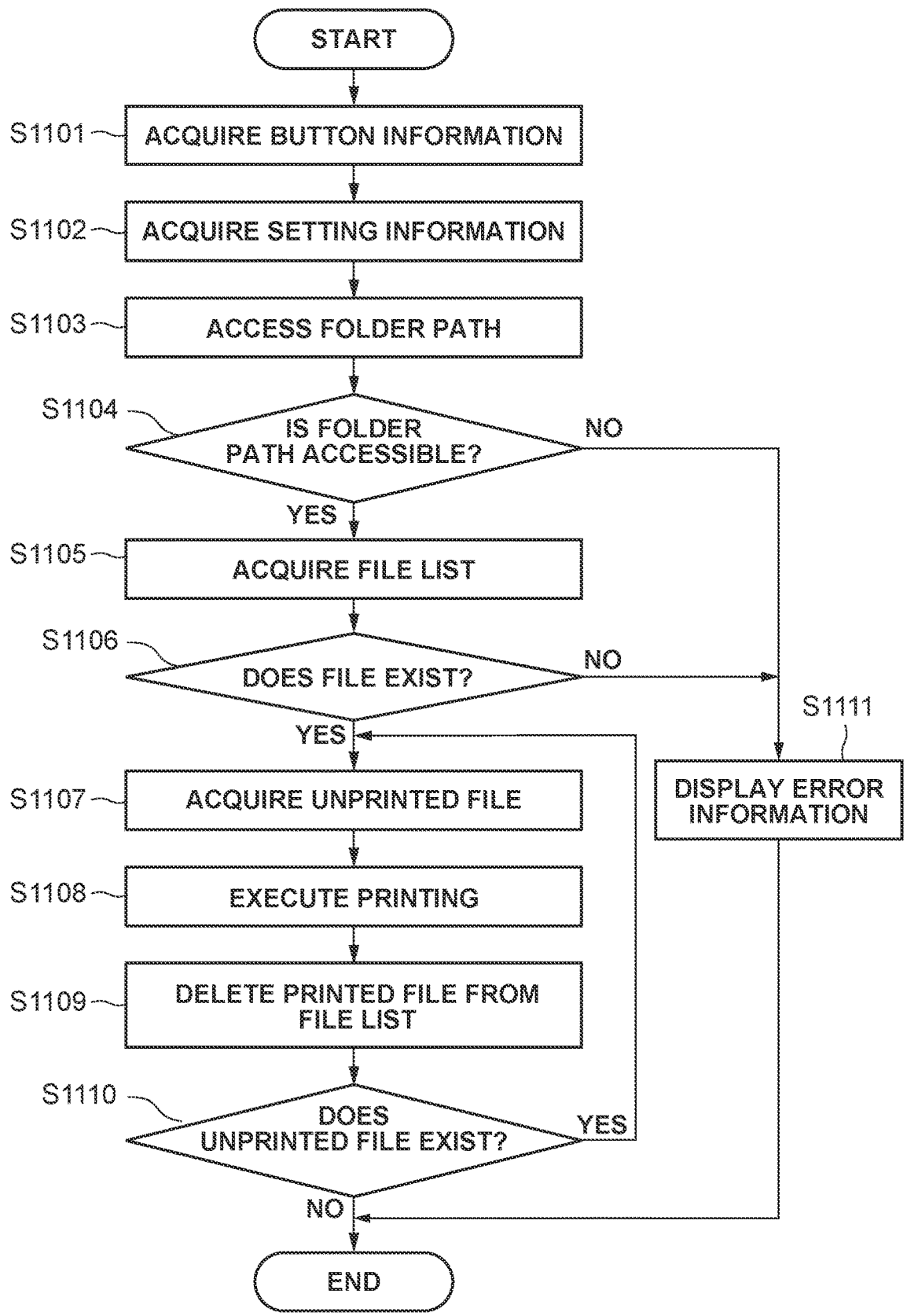
FIG. 11 is a flowchart illustrating printing processing executed when the fixed form printing button is pressed.

FIG. 11 is a flowchart illustrating printing processing executed by the CPU 202 of the image forming apparatus 102 when the fixed form printing button 1007 is pressed.

In step S1101, when the user presses the fixed form printing button 1007, the UI control unit 302 acquires display information of the pressed fixed form printing button 1007 and transmits the display information to the data management unit 304. In step S1102, based on the acquired display information of the fixed form printing button 1007, the data management unit 304 acquires corresponding setting information via the memory control unit 305. In step S1103, the data management unit 304 acquires a folder path from the acquired setting information and accesses the folder path. In step S1104, the data management unit 304 determines whether the folder path is accessible. If the folder path is not accessible (NO in step S1104), the processing proceeds to step S1111. In step S1111, the UI control unit 302 causes the operation unit 207 to display error information indicating that the folder path is not accessible. Then, the processing is ended. If the folder path is accessible (YES in step S1104), the processing proceeds to step S1105. In step S1105, the data management unit 304 acquires a file list of the accessed folder path. After acquiring the file list, in step S1106, the data management unit 304 determines whether a file exists. If a file does not exist (NO in step S1106), the processing proceeds to step S1111. In step S1111, the UI control unit 302 causes the operation unit 207 to display error information indicating that a file does not exist. Then, the processing is ended. If a file exists (YES in step S1106), the processing proceeds to step S1107. In step S1107, the data management unit 304 acquires one unprinted file. Then, in step S1108, printing is executed based on the print settings indicated by the setting information acquired in step S1102. Then, in step S1109, the data management unit 304 deletes the printed file from the file list. In step S1110, the data management unit 304 determines whether an unprinted file exists in the file list. If an unprinted file exists (YES in step S1110), the processing proceeds to step S1107. If an unprinted file does not exist (NO in step S1110), the processing is ended.

In the configuration according to the present exemplary embodiment, unprinted files stored in a folder specified by a folder path are printed. Alternatively, all files stored in the folder may be printed. Alternatively, only a certain number of files satisfying another condition may be printed among the files stored in the folder. For example, "another condition" may be one file that is the latest among the files, a file saved or updated within a week, a file of a specific user, or a file having a file name including a specific character string.

In the present exemplary embodiment, one folder path and print settings are registered in association with one button. In a case where the button is selected, the image forming apparatus 102 acquires a file by using the folder path registered in the button without asking the user to make a selection, and executes printing. In the present exemplary embodiment, the image forming apparatus 102 can execute printing of the file by using the folder path registered in the button without asking the user to make a selection.

In the first exemplary embodiment, when the user selects a button, printing of a file stored in one folder associated with the selected button is executed without asking the user to make a selection.

In a second exemplary embodiment, when a user selects one fixed form printing button 1007, printing of files stored in a plurality of folders associated with the selected fixed form printing button 1007 is executed without asking the user to make a selection. In the present exemplary embodiment, a configuration different from the configuration described in the first exemplary embodiment will be described.

Figure 12:
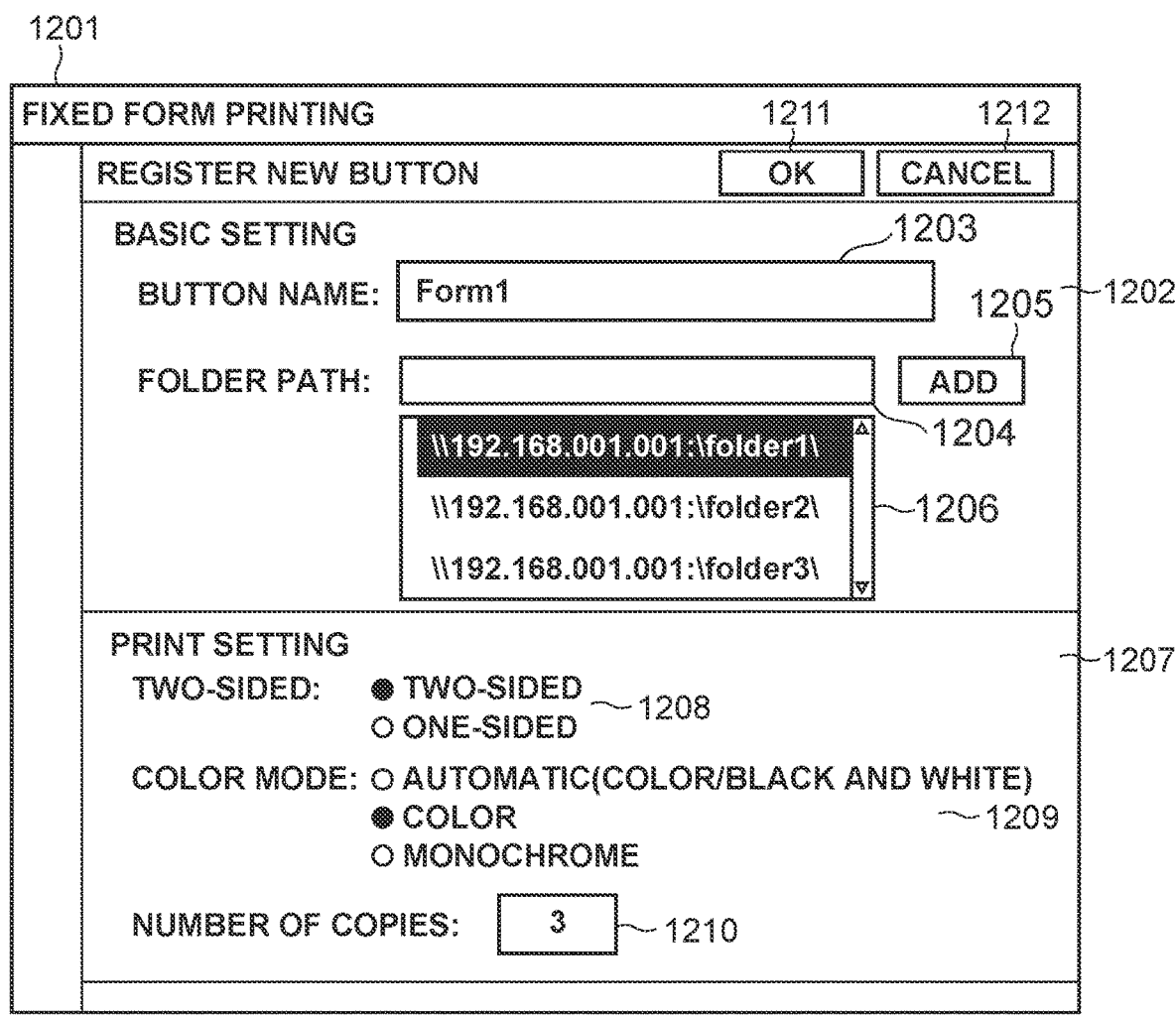
FIG. 12 is a diagram illustrating an example of a new registration screen of the fixed form printing button according to a second exemplary embodiment.

Registration processing of the fixed form printing button 1007 is executed according to the flowcharts illustrated in FIGS. 6 and 8. FIG. 12 is a diagram illustrating an example of a new registration screen of the fixed form printing button 1007 according to the second exemplary embodiment, which is displayed in step S601. Items used to input basic settings are displayed in an area 1202 of a new registration screen 1201 of the fixed form printing button 1007. A textbox 1203 is used to input a button name of the fixed form printing button 1007 to be displayed on the operation unit 207. A textbox 1204 is used to input a folder path indicating a storage destination of a file to be printed when the fixed form printing button 1007 is selected. A button 1205 is used to add the folder path input to the textbox 1204 to a folder path list. A list 1206 displays a folder path indicating a storage destination of a file to be printed, and print settings to be applied when printing of the file specified by the selected folder path is executed are displayed in an area 1207. The list 1206 can include a plurality of folder paths.

The user may manually input a path in the textbox 1204, or may select a referenced folder path by using a reference button (not illustrated). In the present exemplary embodiment, a folder and a file may be saved in the HDD 205 of the image forming apparatus 102, or may be saved in an external storage (not illustrated) accessible by the image forming apparatus 102.

Items used to input print settings are displayed in the area 1207. A radio button 1208 is used to set two-sided printing, a radio button 1209 is used to set a color mode, and a text box 1210 is used to input the number of output copies. An OK button 1211 is pressed when the user confirms the basic setting and the print setting input to the screen. A cancel button 1212 is pressed when the user cancels the basic setting and the print setting input to the screen.

FIG. 13 is a diagram illustrating an example of a setting information management table according to the second exemplary embodiment, which illustrates the setting information saved in step S803. A registration ID for identifying the setting information is described in a column 1302 of a setting information management table 1301. A registration date and time of the setting information is described in a column 1303. A name of the registered fixed form printing button 1007 is described in a column 1304. A storage destination of a file that is to be a printing target when the registered fixed form printing button 1007 is pressed is described in a column 1305. Print settings to be applied when printing is executed by a press of the fixed form printing button 1007 is described in a column 1306. In the configuration according to the present exemplary embodiment, records corresponding to the number of folder paths are retained under the same button name. However, another configuration is also possible as long as a plurality of folder paths can be managed by a single button.

Figure 14:
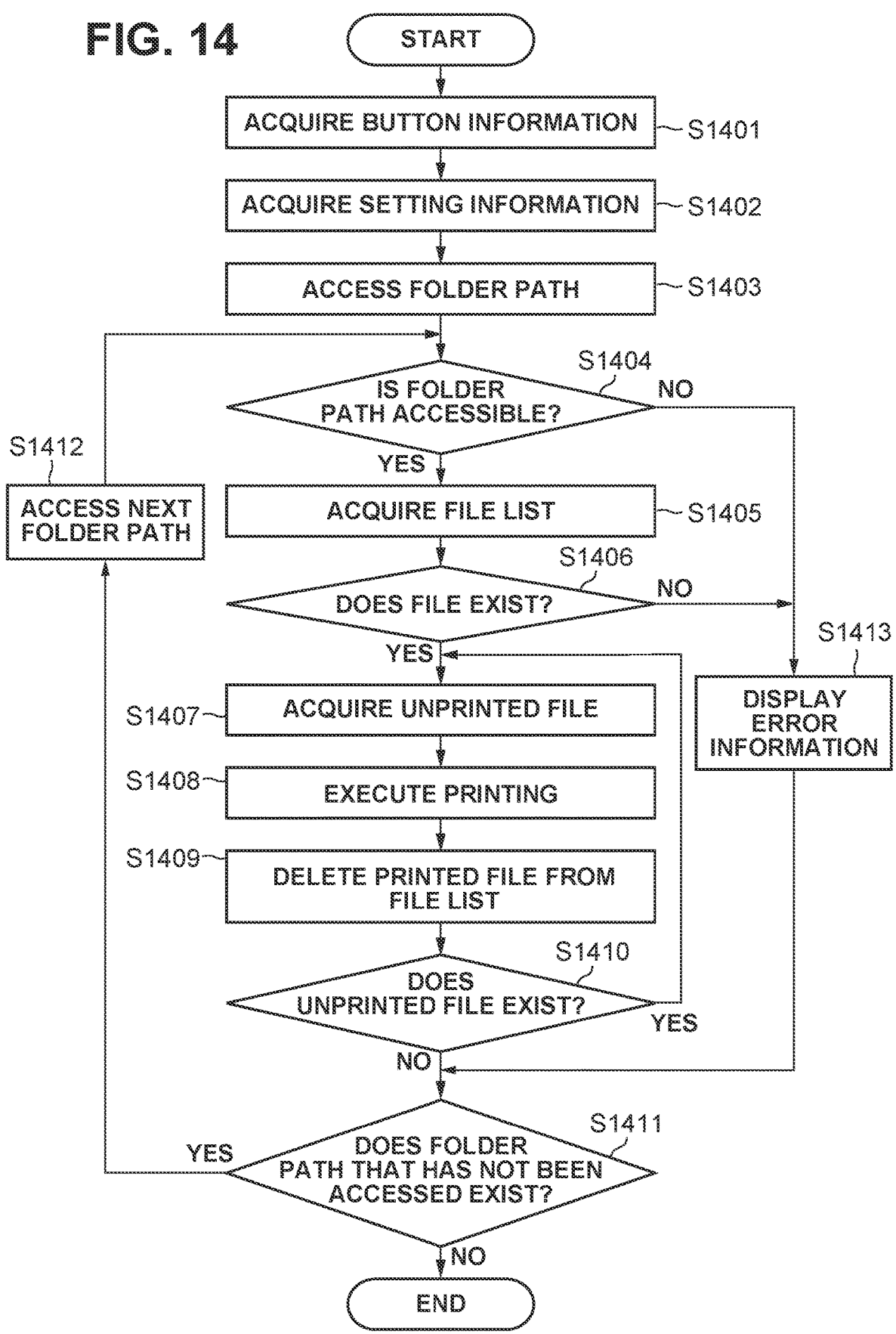
FIG. 14 is a flowchart illustrating printing processing according to the second exemplary embodiment, executed when the fixed form printing button is pressed.

FIG. 14 is a flowchart illustrating printing processing according to the second exemplary embodiment, executed by the CPU 202 of the image forming apparatus 102 when the fixed form printing button 1007 is pressed.

In step S1401, when the user presses the fixed form printing button 1007, the UI control unit 302 acquires display information of the pressed fixed form printing button 1007 and transmits the display information to the data management unit 304. In step S1402, based on the acquired display information of the fixed form printing button 1007, the data management unit 304 acquires corresponding setting information via the memory control unit 305. In a case where a plurality of pieces of corresponding setting information, i.e., more than one folder paths, associated with the fixed form printing button 1007 exists, the data management unit 304 acquires all corresponding records described in the setting information management table 1301. In step S1403, the data management unit 304 acquires a folder path from the acquired setting information and accesses the folder path. In step S1404, the data management unit 304 determines whether the folder path is accessible. If the folder path is not accessible (NO in step S1404), the processing proceeds to step S1413. In step S1413, the UI control unit 302 causes the operation unit 207 to display error information indicating that the folder path is not accessible. Then, the processing proceeds to step S1411.

If the folder path is accessible (YES in step S1404), the processing proceeds to step S1405. In step S1405, the data management unit 304 acquires a file list of the accessed folder path. After acquiring the file list, in step S1406, the data management unit 304 determines whether a file exists. If a file does not exist (NO in step S1406), the processing proceeds to step S1413. In step S1413, the UI control unit 302 causes the operation unit 207 to display error information indicating that a file does not exist. Then, the processing proceeds to step S1411. If a file exists (YES in step S1406), the processing proceeds to step S1407. In step S1407, the data management unit 304 acquires one unprinted file. Then, in step S1408, printing is executed based on the print settings indicated by the setting information acquired in step S1402. Then, in step S1409, the data management unit 304 deletes the printed file from the file list. In step S1410, the data management unit 304 determines whether an unprinted file exists in the file list. If an unprinted file exists (YES in step S1410), the processing proceeds to step S1407. If an unprinted file does not exist (NO in step S1410), the processing proceeds to step S1411. In step S1411, the data management unit 304 determines whether a folder path that has not been accessed exists. If a folder path that has not been accessed exists (YES in step S1411), the processing proceeds to step S1412. In step S1412, the data management unit 304 accesses the next folder path. Then, the processing proceeds to step S1404. If a folder path that has not been accessed does not exist (NO in step S1411), the processing is ended.

In the configuration according to the present exemplary embodiment, unprinted files stored in a folder specified by the folder path are printed. Alternatively, all files stored in the folder may be printed. Alternatively, only a certain number of files satisfying another condition may be printed among the files stored in the folder. For example, "another condition" may be one file that is the latest among the files, a file saved or updated within a week, a file of a specific user, or a file having a file name including a specific character string.

In the present exemplary embodiment, a plurality of folder paths and print settings are registered in association with a single button. In a case where the button is selected, the image forming apparatus 102 acquires files from the respective folders by using the plurality of folder paths registered in that button without asking the user to make a selection, and executes printing. In the present exemplary embodiment, the image forming apparatus 102 can execute printing of the files by using the plurality of folder paths registered in the button without asking the user to make a selection.

In the first and second exemplary embodiments, when the user selects one button, printing of files stored in one or more folders associated with the button is executed without asking the user to make a selection.

In a third exemplary embodiment, when a user selects one fixed form printing button, printing of files stored in a plurality of folders associated with the fixed form printing button and a plurality of files associated with the fixed form printing button is executed without asking the user to make a selection. In the present exemplary embodiment, a configuration different from the configuration described in the first exemplary embodiment will be described.

Figure 15:
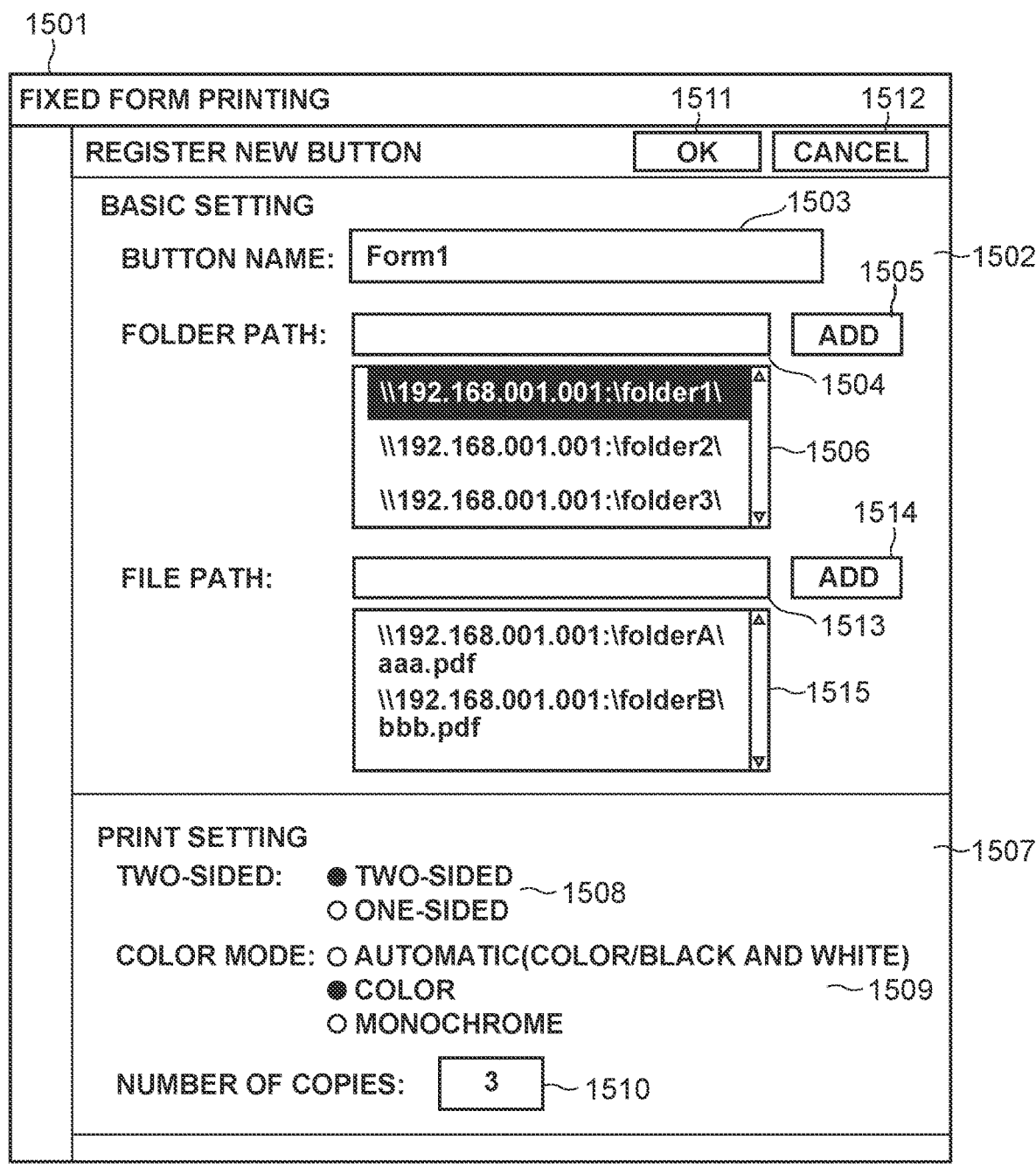
FIG. 15 is a diagram illustrating an example of a new registration screen of the fixed form printing button according to a third exemplary embodiment.

Registration processing of the fixed form printing button 1007 is executed according to the flowcharts illustrated in FIGS. 6 and 8. FIG. 15 is a diagram illustrating an example of a new registration screen of the fixed form printing button 1007 according to the third exemplary embodiment, which is displayed in step S601. Items used to input basic settings are displayed in an area 1502 of a new registration screen 1501 of the fixed form printing button 1007. A textbox 1503 is used to input a button name of the fixed form printing button 1007 to be displayed on the operation unit 207. A textbox 1504 is used to input a folder path indicating a storage destination of a file to be printed when the fixed form printing button 1007 is pressed. A button 1505 is used to add the folder path input to the textbox 1504 to a folder path list. A list 1506 displays a folder path indicating a storage destination of a file to be printed, and print settings to be applied when printing of the file specified by the selected folder path is executed are displayed in an area 1507. A textbox 1513 is used to input a file path of a file to be printed when the fixed form printing button 1007 is pressed. A button 1514 is used to add the file path input to the textbox 1513 to a file path list. A list 1515 displays a file path of a file to be printed, and print settings to be applied when printing of the file specified by the selected file path is executed are displayed in the area 1507.

The user may manually input a path in each of the textboxes 1504 and 1513, or may select a referenced folder path or a referenced file path by using a reference button (not illustrated). In the present exemplary embodiment, a folder and a file may be saved in the HDD 205 of the image forming apparatus 102, or may be saved in an external storage (not illustrated) accessible by the image forming apparatus 102.

Items used to input print settings are displayed in the area 1507. A radio button 1508 is used to set two-sided printing, a radio button 1509 is used to set a color mode, and a text box 1510 is used to input the number of output copies. An OK button 1511 is pressed when the user confirms the basic setting and the print setting input to the screen. A cancel button 1512 is pressed when the user cancels the basic setting and the print setting input to the screen.

FIG. 16 is a diagram illustrating an example of a setting information management table according to the third exemplary embodiment, which illustrates the setting information saved in step S803. A registration ID for identifying the setting information is described in a column 1602 of a setting information management table 1601. A registration date and time of the setting information is described in a column 1603. A name of the registered fixed form printing button 1007 is described in a column 1604. A storage destination of a file that is to be a printing target when the registered fixed form printing button 1007 is pressed is described in a column 1605. A name of the file to be a printing target is described in a column 1606. Print settings to be applied when printing is executed by a press of the fixed form printing button 1007 is described in a column 1607. In the configuration according to the present exemplary embodiment, records corresponding to the number of folder paths and the number of specified files are retained under the same button name. However, another configuration is also possible as long as the plurality of folder paths and the specified files can be managed by a single button.

FIG. 17 is a flowchart illustrating printing processing according to the third exemplary embodiment, executed by the CPU 202 of the image forming apparatus 102 when the fixed form printing button 1007 is pressed.

In step S1701, when the user presses the fixed form printing button 1007, the UI control unit 302 acquires display information of the pressed fixed form printing button 1007 and transmits the acquired display information to the data management unit 304. In step S1702, based on the acquired display information of the fixed form printing button 1007, the data management unit 304 acquires corresponding setting information via the memory control unit 305. In a case where a plurality of pieces of corresponding setting information, i.e., more than one folder paths, associated with the fixed form printing button 1007 exists, the data management unit 304 acquires all corresponding records described in the setting information management table 1601. In step S1703, the data management unit 304 acquires a folder path from the acquired setting information and accesses the folder path. In step S1704, the data management unit 304 determines whether the folder path is accessible. If the folder path is not accessible (NO in step S1704), the processing proceeds to step S1716. In step S1716, the UI control unit 302 causes the operation unit 207 to display error information indicating that the folder path is not accessible. Then, the processing proceeds to step S1712.

If the folder path is accessible (YES in step S1704), the processing proceeds to step S1705. In step S1705, the data management unit 304 determines whether a file is specified in the corresponding setting information. If a file is specified (YES in step S1705), the processing proceeds to step S1714. In step S1714, the data management unit 304 acquires the file. In step S1715, printing is executed based on the print settings indicated by the setting information acquired in step S1702. If a file is not specified (NO in step S1705), the processing proceeds to step S1706. In step S1706, the data management unit 304 acquires a file list of the accessed folder path. After acquiring the file list, in step S1707, the data management unit 304 determines whether a file exists. If a file does not exist (NO in step S1707), the processing proceeds to step S1716. In step S1716, the UI control unit 302 causes the operation unit 207 to display error information indicating that a file does not exist. Then, the processing proceeds to step S1712. If a file exists (YES in step S1707), the processing proceeds to step S1708. In step S1708, the data management unit 304 acquires one unprinted file. Then, in step S1709, printing is executed based on the print settings indicated by the setting information acquired in step S1702. Then, in step S1710, the data management unit 304 deletes the printed file from the file list. In step S1711, the data management unit 304 determines whether an unprinted file exists in the file list. If an unprinted file exists (YES in step S711), the processing proceeds to step S1708. If an unprinted file does not exist (NO in step S1711), the processing proceeds to step S1712. In step S1712, the data management unit 304 determines whether a folder path that has not been accessed exists. If a folder path that has not been accessed exists (YES in step S1712), the processing proceeds to step S1713. In step S1713, the data management unit 304 accesses the next folder path. Then, the processing proceeds to step S1704. If a folder path that has not been accessed does not exist (NO in step S1712), the processing is ended.

In the configuration according to the present exemplary embodiment, unprinted files stored in the folder specified by the folder path are printed. Alternatively, all files stored in the folder may be printed. Alternatively, only a certain number of files satisfying another condition may be printed among the files stored in the folder. For example, "another condition" may be one file that is the latest among the files, a file saved or updated within a week, a file of a specific user, or a file having a file name including a specific character string.

Further, in the configuration according to the present exemplary embodiment, while printing of a file specified by a file path is executed, printing may be executed when the file specified by the file path satisfies a condition. For example, "condition" may be an unprinted file, a file saved or updated within a week, a file of a specific user, or a file having a file name including a specific character string.

Further, the present exemplary embodiment can also be applied to a configuration in which printing of a plurality of files associated with a button is executed without asking the user to make a selection when the button which is associated with the plurality of files but not with a plurality of folders is selected. Furthermore, the present exemplary embodiment can also be applied to a configuration in which printing of one or more files and files stored in one or more folders associated with a button is executed without asking the user to make a selection when the button which is associated with the one or more files and the one or more folders is selected.

Embodiments of the present disclosure also include an apparatus or a system having a configuration in which the above-described exemplary embodiments are combined as appropriate, and the method thereof.

Herein, embodiments of the present disclosure are embodied in an apparatus or a system serving as a main body which executes one or more software components (programs) for implementing the functions according to the above-described exemplary embodiments. Further, a method for realizing the above-described exemplary embodiments, which is executed by the apparatus or the system, is also one aspect of the present disclosure. Further, the program is supplied to the system or the apparatus via a network or various storage media, so that one or more computers (CPUs or micro-processing units (MPUs)) of the system or the apparatus read and execute the program. In other words, the program and various computer-readable storage media storing the program are also included in one aspect of the present disclosure. Further, one aspect of the present disclosure can also be realized with a circuit (e.g., application specific integrated circuit (ASIC)) which implements the functions according to the above-described exemplary embodiments.

According to embodiments of the present disclosure, in a case where a button registered in association with path information indicating a file storage destination and print settings is selected, printing of one or more files stored in the file storage destination can be executed without asking a user to make a selection.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192728, filed Nov. 29, 2021, which is hereby incorporated by reference herein in its entirety.

What is claimed is:

1. An image forming apparatus comprising:
one or more processors that execute a set of instructions, the instructions, when executed, causing the image forming apparatus to perform operations comprising:
registering a plurality of pieces of path information each indicating a file storage destination and print settings in association with a button;
displaying a screen including the registered button;
acquiring one or more files by using the plurality of pieces of path information without asking a user to make a selection in a case where the displayed button is selected; and
executing printing of the acquired one or more files based on the print settings,
wherein after accessing a first file storage destination is executed to acquire one or more files, accessing a second file storage destination is executed to acquire one or more files, and
wherein in a case where accessing the second file storage destination fails, an error is output and thereafter accessing a third file storage destination is executed to acquire one or more files.

2. The image forming apparatus according to claim 1, wherein the plurality of pieces of path information includes one or more folder paths.

3. The image forming apparatus according to claim 1, wherein the plurality of pieces of path information includes one or more file paths.

4. The image forming apparatus according to claim 1, wherein the registering further registers the button in association with a condition for specifying a file in a file storage destination indicated by the path information.

5. The image forming apparatus according to claim 1, wherein the screen displayed is a function selection screen displayed on an operation unit of the image forming apparatus.

6. A method for controlling an image forming apparatus, the method comprising:
registering a plurality of pieces of path information each indicating a file storage destination and print settings in association with a button;
displaying a screen including the registered button;
acquiring one or more files by using the plurality of pieces of path information without asking a user to make a selection in a case where the displayed button is selected; and
executing printing of the acquired one or more files based on the print settings,
wherein after accessing a first file storage destination is executed to acquire one or more files, accessing a second file storage destination is executed to acquire one or more files, and
wherein in a case where accessing the second file storage destination fails, an error is output and thereafter accessing a third file storage destination is executed to acquire one or more files.

7. A non-transitory computer-readable storage medium storing one or more programs including instructions, which when executed by one or more processors of the image forming apparatus, cause the image forming apparatus to perform the method according to claim 6.

* * * * *